United States Patent
Duggi et al.

(10) Patent No.: US 7,480,248 B2
(45) Date of Patent: Jan. 20, 2009

(54) APPARATUS AND METHOD FOR DETERMINING AGGREGATED LINK COSTS IN A MOBILE AD HOC NETWORK

(75) Inventors: Mohan R. Duggi, Garland, TX (US); Jinhui Zhou, Richardson, TX (US); Nim K. Leung, Plano, TX (US); Sudhindra Herle, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 835 days.

(21) Appl. No.: 10/763,409

(22) Filed: Jan. 23, 2004

(65) Prior Publication Data
US 2005/0041591 A1 Feb. 24, 2005

Related U.S. Application Data

(60) Provisional application No. 60/497,396, filed on Aug. 22, 2003.

(51) Int. Cl.
*H04L 12/28* (2006.01)
(52) U.S. Cl. .................. 370/238; 370/252; 370/310; 455/405
(58) Field of Classification Search .......... 370/311, 370/222, 341, 253
See application file for complete search history.

(56) References Cited

U.S. PATENT DOCUMENTS 7,151,769 B2 * 12/2006 Stanforth et al. ............ 370/351
2003/0161268 A1 * 8/2003 Larsson et al. .............. 370/229
2003/0179718 A1 * 9/2003 Ebata et al. ................. 370/255
2004/0233855 A1 * 11/2004 Gutierrez et al. ............ 370/252
2004/0233882 A1 * 11/2004 Park et al. ................... 370/338
2005/0013253 A1 * 1/2005 Lindskog et al. ............ 370/238
2005/0036486 A1 * 2/2005 Sahinoglu et al. ........... 370/389
2006/0007863 A1 * 1/2006 Naghian ..................... 370/238

* cited by examiner

*Primary Examiner*—Chi H. Pham
*Assistant Examiner*—Shick Hom

(57) ABSTRACT

For use in a mobile ad hoc network (MANET), a first MANET node for aggregating route cost information associated with a first route from a source MANET node to a destination MANET node. The first MANET node comprises: 1) a radio frequency (RF) transceiver for wirelessly communicating with other MANET nodes; and 2) a controller for receiving incoming data packets from the RF transceiver and sending outgoing data packets to the RF transceiver. The controller receives a Route Request (RREQ) message generated by the source MANET node and retrieves initial route cost information from the RREQ message. The initial route cost information comprises an RF link cost parameter for a preceding RF link between the first MANET node and the source MANET node and a node cost parameter for a preceding MANET node between the first MANET node and the source MANET node.

20 Claims, 4 Drawing Sheets

APPARATUS AND METHOD FOR DETERMINING AGGREGATED LINK COSTS IN A MOBILE AD HOC NETWORK

CLAIM OF PRIORITY TO PRIOR APPLICATION

The present invention claims priority to U.S. Provisional Patent Application Ser. No. 60/497,396, which was filed on Aug. 22, 2003.

CROSS-REFERENCE TO RELATED APPLICATION

The present invention is related to that disclosed in the following U.S. Provisional Patent Application Ser. No. 60/497,396, filed on Aug. 22, 2003, entitled "PARAMETER BASED AGGREGATED LINK COST OPERATIONS IN MANET ROUTING PROTOCOLS."

TECHNICAL FIELD OF THE INVENTION

The present invention relates generally to wireless networks and, more specifically, to a mobile ad hoc network (MANET) that calculates link costs for each hop and node in the MANET.

BACKGROUND OF THE INVENTION

Wireless network topologies that enable wireless nodes (i.e., mobile stations, wireless terminals) to communicate with each other and with fixed networks generally fall into two categories: i) infrastructure-based and ii) infrastructure-less. Infrastructure-based networks have traditionally been based on the cellular concept and require a high level of infrastructure support. In an infrastructure-based network, wireless nodes communicate through access points (e.g., base stations) connected to the fixed network (e.g., Internet). Typical infrastructure-based networks include GSM networks, UMTS networks, CDMA networks, WLL networks, WLAN, and the like.

In an infrastructureless network, wireless nodes (i.e., mobile stations, wireless terminals) communicate directly rather than through access points or other base stations. One common and increasingly popular infrastructureless network topology is the mobile ad hoc network (MANET). A MANET is a group of wireless nodes that dynamically form a network with each other and without using any pre-existing fixed network infrastructure. In most cases, wireless nodes of a MANET are small mobile devices that are relatively limited in term of CPU capability, memory size, and power consumption.

Mobile ad hoc networks are expected to continue to grow over the next 2-3 years to become the dominant peer-to-peer communication technology. Cell phones are being equipped with IEEE-802.11 and other wireless LAN technologies. The proliferation of cell phones and the ubiquity of economical IEEE-802.11 networks will create a new kind of mobile, ad-hoc and peer-to-peer network.

As noted above, a mobile ad hoc network (MANET) can be set up without using a pre-existing network infrastructure. This can be done anywhere and at anytime. The wireless nodes of a MANET are connected by wireless links and are free to move randomly. The wireless nodes also act as routers. A MANET supports traffic types that are different from the traffic types typically found in an infrastructure-based wireless network. MANET traffic types include: 1) peer-to-peer traffic; 2) remote-to-remote traffic; and 3) dynamic traffic.

In peer-to-peer traffic, there is only one hop between the communicating wireless nodes (i.e., direct communication). In this instance, the network traffic (in bits/second) is usually constant. In remote-to-remote traffic, there are two or more hops between communicating wireless nodes, but a stable route is maintained between the source and destination nodes. This often occurs if several nodes stay within range of each other in one area or if the nodes move as a group. Dynamic traffic results when the MANET nodes move around and communication routes must be reconstructed. This often causes poor connectivity and network traffic occurs in short bursts.

Each MANET node is autonomous and may function as both a host and a router. Thus, each wireless node performs basic host processing and performs router switch functions. Thus, endpoints and switches are indistinguishable in a MANET. Since there is no central network to control network operations, control and management of a MANET is distributed among the wireless nodes. The MANET nodes cooperate to implement security and routing functions.

A MANET may implement different types of routing. Basic types of ad hoc routing algorithms are single-hop and multi-hop. These are based on different link layer attributes and routing protocols. A single-hop MANET is simpler than a multi-hop MANET, but lacks the functionality and flexibility of a multi-hip MANET. When delivering data packets from a source to its destination out of the direct wireless transmission range, the packets should be forwarded via one or more intermediate nodes.

Since MANET nodes are mobile, the radio frequency (RF) links may change rapidly and unpredictably over time. In order to compensate for traffic and propagation conditions, the MANET nodes dynamically modify routing information between each other as the nodes move, thereby forming new network topologies. Advantageously, a MANET node may operate not only within the mobile ad hoc network, but also may access a public fixed network (e.g., cellular network).

MANET nodes may use, for example, an Ad Hoc On-Demand Distance Vector (AODV) routing protocol in ad hoc network environments in which the movement of the MANET nodes cause frequent changes in RF link quality. The AODV protocol enables the MANET nodes to adapt quickly to dynamic link conditions. The AODV algorithm enables dynamic, self-starting, multi-hop routing between mobile MANET nodes in an ad-hoc network. The AODV protocol enables the mobile MANET nodes to obtain routes for new destinations quickly and does not require the MANET nodes to maintain routes to destinations that are not in active communication. The AODV protocol provides quick convergence when the ad hoc network topology changes (e.g., a new MANET node joins the network).

The AODV protocol uses a destination sequence number for each route entry. The destination node creates a destination sequence number for any usable route information the destination node sends to a requesting node. Using destination sequence numbers ensures loop freedom (i.e., prevents loops). Given a choice between two routes to a destination MANET node, a requesting node always selects one with the greatest sequence number. Advantageously, when the AODV protocol detects an RF link breakage, the AODV protocol immediately transmits notifications only to the affected set of nodes. Other nodes are not notified.

The current state of the art in MANET routing algorithms can be classified into two broad types: i) pro-active protocols and ii) reactive protocols. A proactive protocol typically uses a single aggregate value as the route cost between a source MANET node and a destination MANET node. Unfortunately, this means that fine-grained information is lost. Furthermore, the routing table in a pro-active protocol contains only one best route that is associated with the single aggregate value. This is a disadvantage because two different applications on the same node might have different quality-of-service (QoS) requirements. For example, an FTP application requires large bandwidth and a low error rate and tolerates high latency. However, a voice application requires low bandwidth and a low latency and tolerates a moderate number of errors. Using a single aggregate value to compute the best route cannot provide good service to both applications simultaneously.

A reactive protocol is a MANET routing algorithm that uses the Hop Count value as the metric for choosing the best route. However, research has shown that the Hop Count value alone is not a good routing metric. In addition, when a MANET routing algorithm is applied on a battery-operated device (e.g., cell phone), it is necessary to consider the effects of multi-hop routing on battery life.

Therefore, there is a need in the art for improved routing protocols for use in mobile ad hoc networks. In particular, there is a need for an improved routing protocol that does not rely on a single metric for determining the best routes from a source MANET node to a destination MANET node.

SUMMARY OF THE INVENTION

The present invention introduces an apparatus and related method for augmenting the performance of mobile ad hoc network (MANET) routing algorithms by incorporating a flexible metric to quantify the quality of wireless links and nodes in the MANET. Specifically, the present invention discloses a method of calculating the cost of each link and node in the mobile ad hoc network. The method according to the present invention may be easily incorporated into reactive MANET routing protocols.

To address the above-discussed deficiencies of the prior art, it is a primary object of the present invention to provide, for use in a mobile ad hoc network formed by a plurality of mobile ad hoc network (MANET) nodes, a first MANET node capable of aggregating route cost information associated with a first route from a source MANET node to a destination MANET node. According to an advantageous embodiment of the present invention, the first MANET node comprises: 1) a radio frequency (RF) transceiver capable of wirelessly communicating with other ones of the plurality of MANET nodes; and 2) a controller capable of receiving incoming data packets from the RF transceiver and sending outgoing data packets to the RF transceiver. The controller receives a Route Request (RREQ) message generated by the source MANET node and retrieves initial route cost information from the RREQ message, the initial route cost information comprising at least one of: a) at least one radio frequency (RF) link cost parameter of at least one preceding RF link between the first MANET node and the source MANET node in the first route; and b) at least one node cost parameter of at least one preceding MANET node between the first MANET node and the source MANET node in the first route.

According to one embodiment of the present invention, the at least one RF link cost parameter is a zero value and the at least one node cost parameter is a zero value if the first MANET node receives the RREQ message directly from the source MANET node.

According to another embodiment of the present invention, the controller stores the initial route cost information retrieved from the RREQ message in a route table associated with the first MANET node.

According to still another embodiment of the present invention, the controller updates the initial route cost information in the RREQ message by adding to the initial route cost information at least one of: a) an RF link cost parameter associated with an RF link to an immediately preceding MANET node between the first MANET node and the source MANET node in the first route; and b) a first node cost parameter associated with the first MANET node.

According to yet another embodiment of the present invention, the controller forwards the RREQ message containing the updated route cost information to a next MANET node between the first MANET node and the destination MANET node in the first route.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged mobile ad hoc network.

Figure 1:
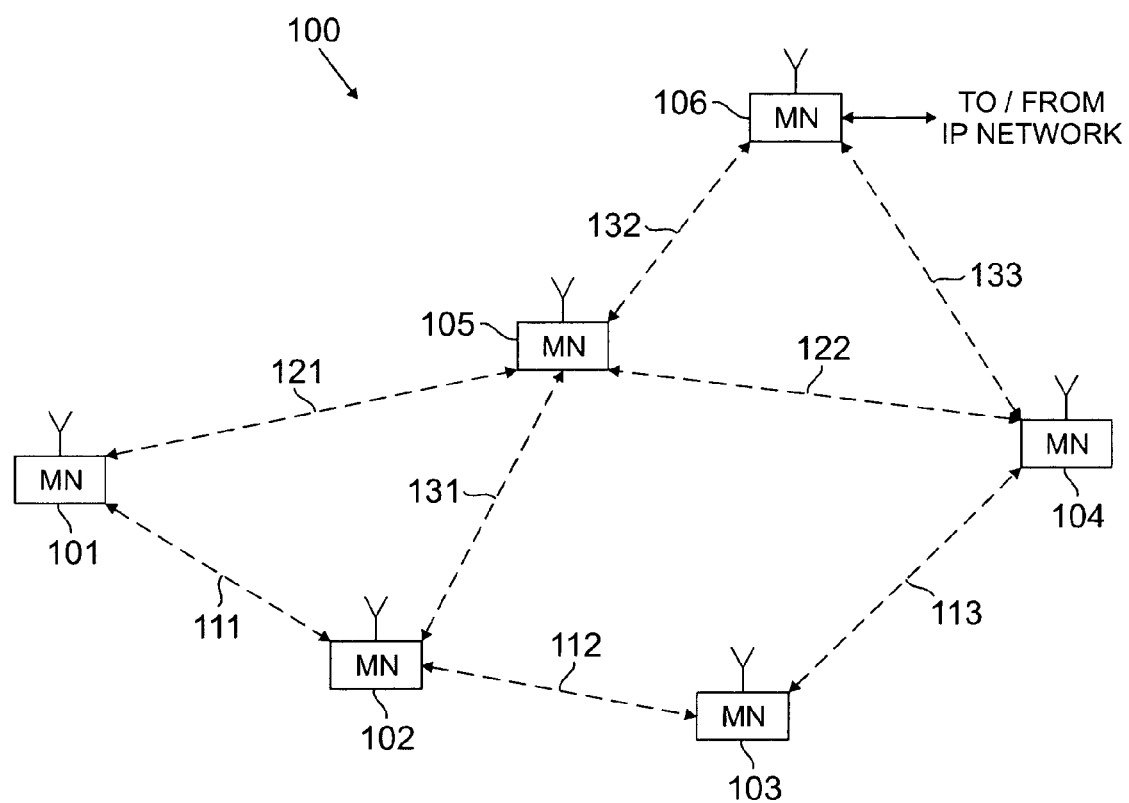
FIG. 1 illustrates an exemplary mobile ad hoc network (MANET) according to the principles of the present invention.

FIG. 1 illustrates exemplary mobile ad hoc network (MANET) 100 according to the principles of the present invention. MANET 100 comprises MANET nodes (MN) 101-106. Each one of MN 101-MN 106 is a conventional wireless terminal (e.g., cell phone, IEEE-802.11 device) that operates as a conventional MANET node. In an advantageous embodiment, at least some of MANET nodes 101-106 in MANET 100 may be multi-purpose wireless devices that can function in more than one type of wireless network. By way of example, MN 105 may comprise a dual-purpose transceiver that operates 1) as a CDMA2000 cell phone that accesses public cell phone networks; and 2) as an IEEE-802.11 wireless terminal that can operate in MANET 100.

Furthermore, at least one of MN 101-MN 106 may comprise a base station, access point, or other wireless terminal of a fixed infrastructure-based network, such as a cell phone network. For example, MN 106 may be an access point of an IEEE-802.11 wireless network that is coupled to a wireline Internet protocol (IP) network. Thus, MN 106 may function autonomously in MANET 100 or may act as an access point that allows, for example, MN 105 to access the Internet.

Each one of MANET nodes 101-106 is aware of the Internet protocol (IP) addresses of all of MANET nodes 101-106 and is capable of directly communicating with other ones of MANET nodes 101-106 via individual radio frequency (RF) links (or hops). The RF links (or hops) are shown as dotted lines in FIG. 1. MN 101 and MN 102 communicate via hop 111. MN 102 and MN 103 communicate via hop 112. MN 103 and MN 104 communicate via hop 113. MN 101 and MN 105 communicate via hop 121. MN 105 and MN 104 communicate via hop 112. MN 102 and MN 105 communicate via hop 131. MN 105 and MN 106 communicate via hop 132. MN 106 and MN 104 communicate via hop 133. Other hops may exist in MANET 100. However, for the sake of simplicity and clarity in explaining the present invention, these other hops are not shown.

The routes connecting a first MANET node and second MANET node may be specified in terms of the hops connecting the first and second MANET nodes. For example, MN 101 may communicate with MN 104 by a first route (Route A) comprising hops 121 and 122, by a second route (Route B) comprising hops 111, 112 and 113, and by a third route (Route C) comprising hops 111, 131, 132, and 133. Route A contains the least number of hops and Route C contains the most number of hops.

According to the principles of the present invention, MANET nodes 101-106 communicate using an improved version of the Ad Hoc On-Demand Distance Vector (AODV) protocol. The AODV protocol is used by way of example only and should not be construed so as to limit the scope of the present invention. Other protocols may be used in alternative embodiments of the present invention. The present invention provides a new method of defining of route cost for each hop and node in MANET 100. This route cost is calculated as a function of several parameters. These parameters are classified into two broad categories:

1) Link Parameters—Link parameters depend on the radio frequency (RF) link between any two MANET nodes (e.g., radio link quality as expressed by packet error rate); and ii) Node Parameters—Node parameters depend on the time-varying parameters in each MANET node (e.g., battery life, buffer congestion, user willingness, buffer occupancy, etc.).

Figure 2:
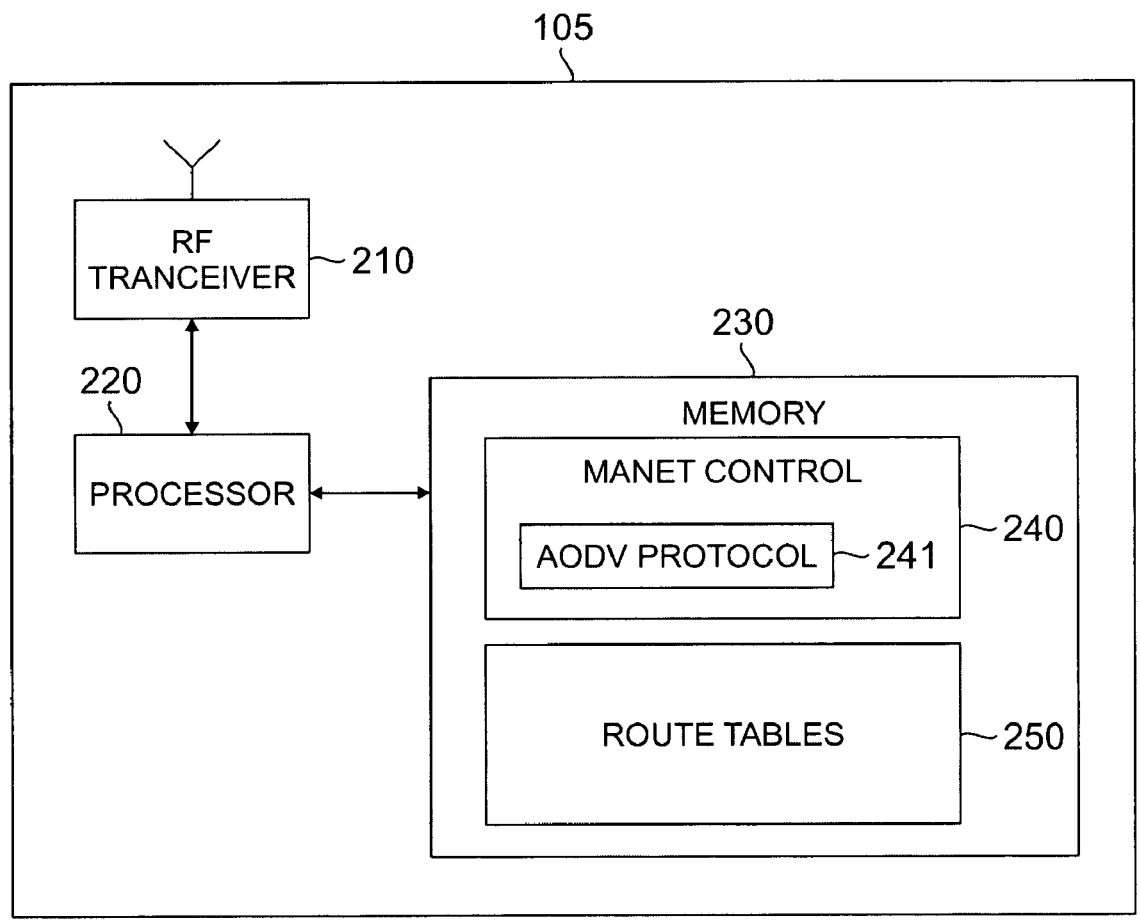
FIG. 2 illustrates an exemplary MANET node in greater detail according to one embodiment of the present invention.

FIG. 2 illustrates exemplary MANET node 105 in greater detail according to one embodiment of the present invention. MANET node (MN) 105 comprises radio frequency transceiver 210, data processor 220, and memory 230. Memory 230 stores MANET control program 240 and route tables 250, among other things. MANET control program 240 comprises AODV protocol algorithm 241. Data processor 220 executes the instructions in MANET control program 240, including the instructions stored in AODV protocol program 241. Together, data processor 220 and memory 230 form a controller that implements the present invention in MANET node 105.

When MANET node 105 is operating in MANET 100, data processor 220 builds route table 250 by storing route information received from neighboring MANET nodes. Under the control of AODV protocol algorithm 241, data processor 220 builds route table 250 using conventional AODV protocol messages, such as the Route Request (RREQ) message, the Route Reply (RREP) message, the Route Error (RERR) message, the Route Reply Acknowledgment (RREP ACK) message, and the like.

AODV protocol algorithm 241 is capable of both unicast and multicast routing. AODV protocol algorithm 241 builds a route between MANET nodes only when requested by a source node. AODV protocol algorithm 241 maintains each route only for as long as the source node needs the route. AODV protocol algorithm 241 uses sequence numbers to ensure the freshness of routes. The route information for each route in Route Table 250 typically includes Destination IP Address, Destination Sequence Number, Valid Destination Sequence Number flag, Hop Count (number of hops need to reach destination), Next Hop, and a list of Precursor nodes, among other data values.

According to the principles of the present invention, data processor 220, under the control of MANET control program and AODV protocol algorithm 241, acts as a monitor that measures (or calculates) the link parameters and node parameters described above, either periodically or when a packet is received. The present invention augments route request (RREQ) messages and route reply (RREP) messages to contain these cost parameters.

Figure 3:
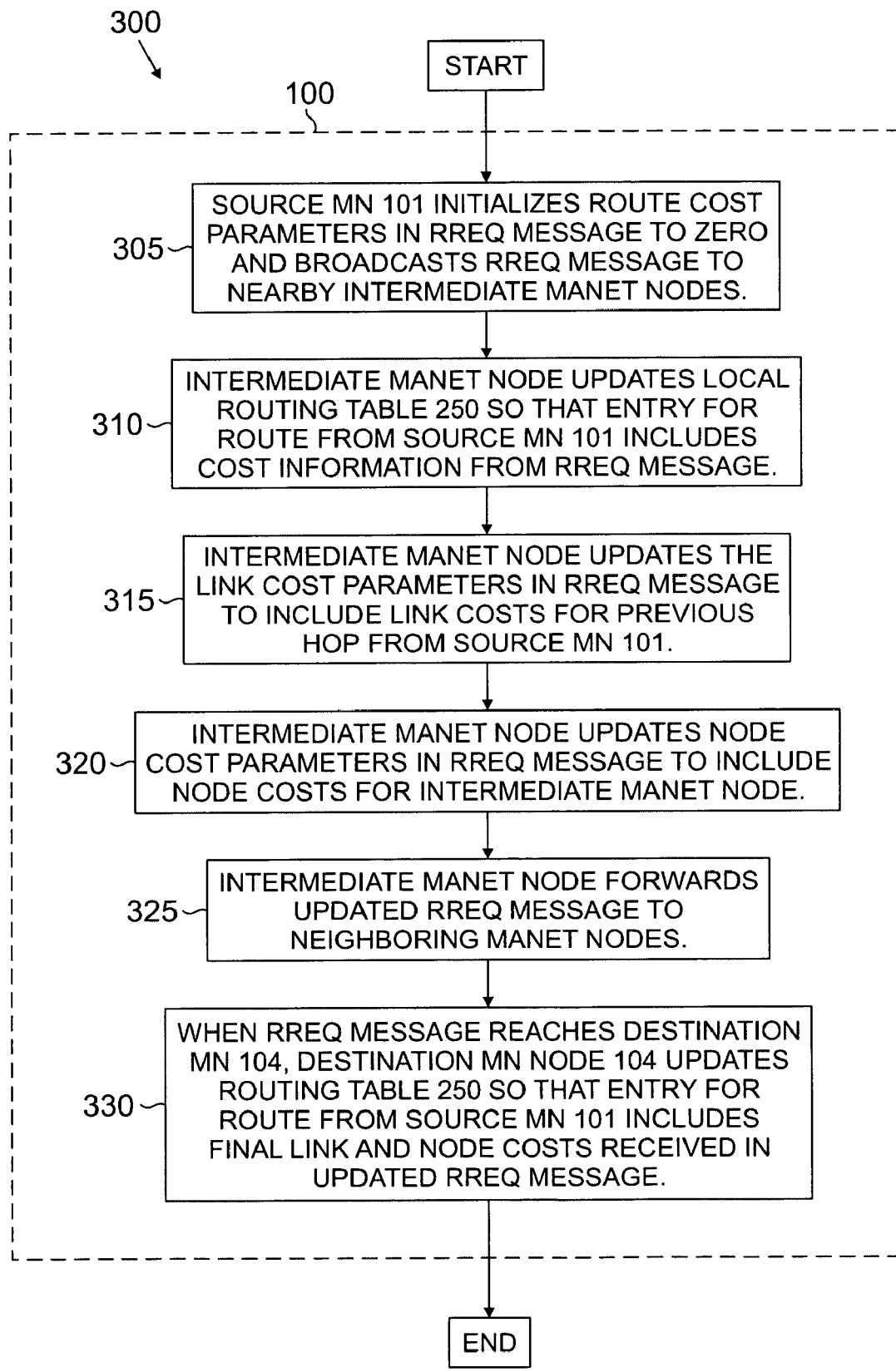
FIG. 3 is a flow diagram illustrating an algorithm for obtaining the total cost of a route from a source MANET node to a destination MANET node according to one embodiment of the present invention.

FIG. 3 depicts flow diagram 300, which illustrates an algorithm for obtaining the total cost of a route from source MANET node 101 to destination MANET node 104 according to one embodiment of the present invention. Source MANET node 101 initializes the route cost parameters in a Route Request (RREQ) message to zero and broadcasts the RREQ message to nearby (or neighboring) intermediate MANET nodes, such as MN 102 and MN 105 (process step 305).

When an intermediate MANET node receives the broadcast RREQ message from source MANET node 101, the intermediate MANET node updates its local routing table so that the entry for the route from source MANET node 101 includes the cost information received in the RREQ message (process step 310). The intermediate MANET node then updates the link cost parameters in the RREQ message to include the link costs (e.g., bit error rate) associated with the previous hop from source MANET node 101 (process step 315). The intermediate MANET node also updates the node cost parameters in the RREQ message to include the node costs associated with the intermediate MANET node (process step 320). Finally, the intermediate MANET node forwards (broadcasts) the updated RREQ message to its neighboring MANET nodes (process step 325). When the RREQ message finally reaches destination MANET node 104, destination MANET node 104 updates its routing table so that the entry for the route from source MANET node 101 includes the final, updated link and node cost information received in the updated RREQ message (process step 330).

Figure 4:
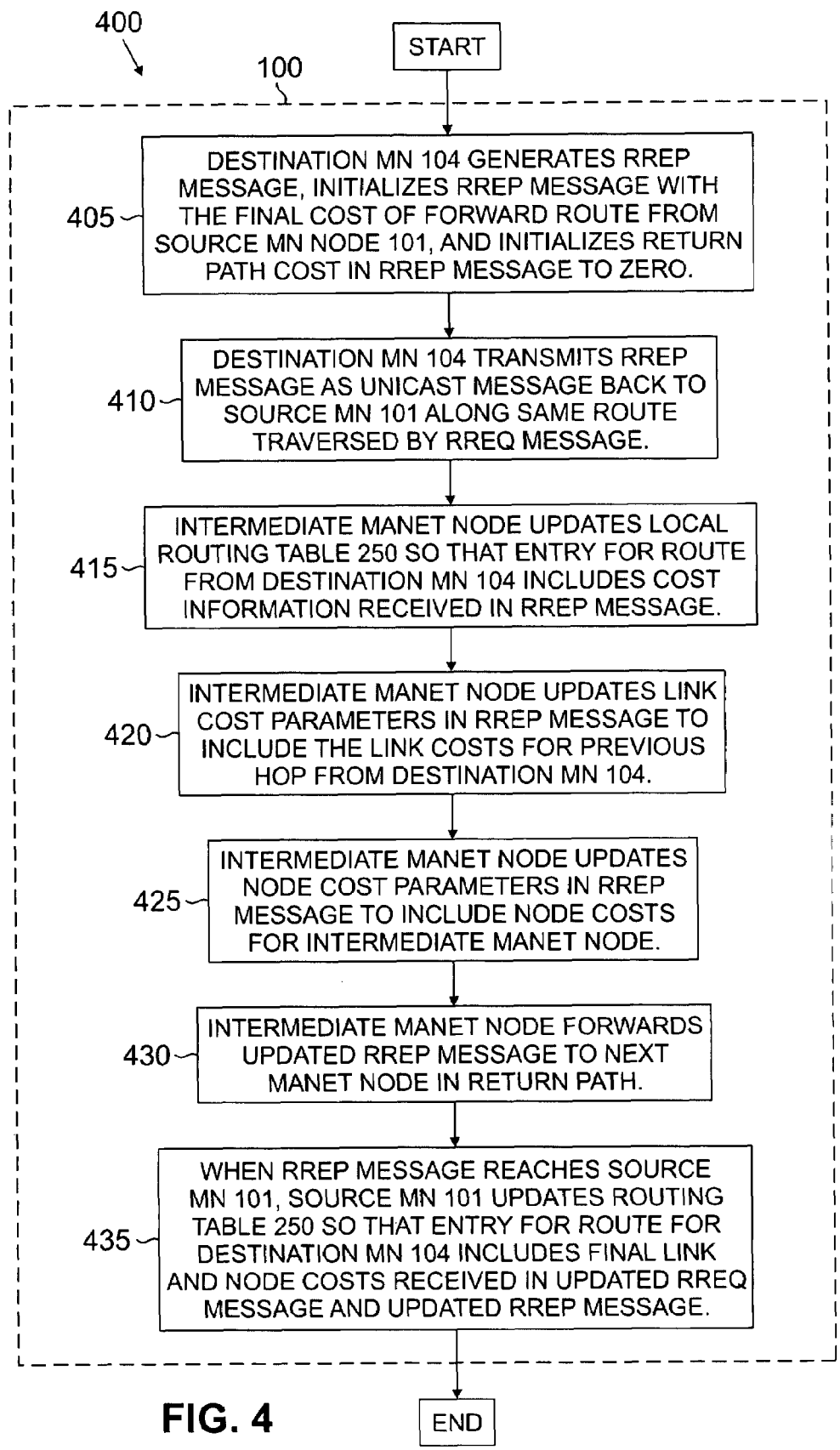
FIG. 4 is a flow diagram illustrating an algorithm for obtaining the total cost of a return route from a destination MANET node back to a source MANET node according to one embodiment of the present invention.

FIG. 4 depicts flow diagram 400, which illustrates an algorithm for obtaining the total cost of a return route from destination MANET node 104 back to source MANET node 101 according to one embodiment of the present invention. After receiving the updated RREQ message, destination MANET node 104 generates a Route Reply (RREP) message and initializes the RREP message with the final, updated cost of the forward route from source MANET node 101 that was in the RREQ message. Destination MANET node 104 also initializes the return path cost in the RREP message to zero (process step 405). Destination MANET node 104 then transmits the RREP message as a unicast message back to source MANET node 101 along the same route traversed by the RREQ message (process step 410).

Next, the intermediate nodes on the return path handle the unicast RREP message by updating the node and link cost parameters in a manner similar to the steps shown in FIG. 3. When an intermediate MANET node receives the RREP message from destination MANET node 104, the intermediate MANET node updates its local routing table so that the entry for the route from destination MANET node 104 includes the cost information received in the RREP message (process step 415). The intermediate MANET node then updates the link cost parameters in the RREP message to include the link costs (e.g., bit error rate) associated with the previous hop from destination MANET node 104 (process step 420). The intermediate MANET node also updates the node cost parameters in the RREP message to include the node costs associated with the intermediate MANET node (process step 425). Finally, the intermediate MANET node forwards the updated RREP message to the next MANET node in the return path (process step 430). When the RREP message finally reaches source MANET node 101, source MANET node 101 updates its routing table so that the entry for the route associated with destination MANET node 104 includes the final, updated link and node cost information received in both the updated RREQ message and the updated RREP message (process step 435).

Some parameters may vary too quickly over a short period of time. As a result, the instantaneous values of these parameters can provide erroneous results. According to an advantageous embodiment of the present invention, these parameters are smoothed by data processor 220 over a period of time via the following function:

$$A_i = \mu * A + (1-\mu) * A_{i-1} (0 \leq \mu \leq 1),$$

where $A_i$ is the average value for the parameter X during the $i^{th}$ interval, T. The value A is the instantaneous value of the parameter X measured in the present time interval. The $A_{i-1}$ value is the value for the parameter during the previous interval, T−1. The $\mu$ value is a suitable smoothing factor.

The monitoring function executed by the controller formed by processor 220 and memory 230 is configured with cut-off values for each parameter according to user or network preferences. When the value of a parameter falls outside the cut-off range, then the MANET node involved sends a notification message to all MANET nodes in its local Route Table 250. This new notification message is propagated in the same way as a conventional Route Error (RERR) message.

In an advantageous embodiment of the present invention, each parameter may be assigned a priority value. The priority value is a numerical value indicating the relative importance of a parameter in comparison to other parameters. For example, a user might wish to conserve battery life in preference to all other parameters. In such a case, the priority (or weight) of the battery-strength node parameter is set high.

As noted above, when source MANET node 101 receives the final RREP message, source MANET node 101 adds all the advertised routes into its Routing Table 250. Thereafter, the routing algorithm (e.g., AODV protocol algorithm 241) chooses the best route based on the requirements of a particular application in source MANET node 101 and on the criteria that are marked as important.

The present invention overcomes the shortcomings of the prior art in a number of ways. The present invention computes link cost as a function of several time-varying parameters, not one. The present invention enables each MANET node in the route to know the cost of reaching other MANET nodes that hop through it. Also, each node can customize the relative priority of (assign a weight to) each parameter. Finally, the present invention enables the source MANET node to store in its routing table 250 multiple routes to the same destination MANET node, where each route has a different cost parameter. This makes it efficient for different applications to choose the appropriate link.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a mobile ad hoc network formed by a plurality of mobile ad hoc network (MANET) nodes, a first MANET node capable of aggregating route cost information associated with a first route from a source MANET node to a destination MANET node, said first MANET node comprising:

a radio frequency (RF) transceiver capable of wirelessly communicating with other ones of said plurality of MANET nodes; and a controller capable of receiving incoming data packets from said RF transceiver and sending outgoing data packets to said RF transceiver, wherein said controller receives a Route Request (RREQ) message generated by said source MANET node and retrieves initial route cost information from said RREQ message, said initial route cost information comprising at least one RF link cost parameter and at least one node cost parameter, wherein said controller updates said initial route cost information in said RREQ message by adding to said initial route cost information (i) an RF link cost parameter associated with an RF link to an immediately preceding MANET node between said first MANET node and said source MANET node in said first route and (ii) a first node cost parameter associated with said first MANET node, and wherein the controller is further capable of assigning a first node-specific weight to the at least one RF link cost parameter added to the initial route cost information and assigning a second node-specific weight to the at least one node cost parameter added to the initial route cost information.

2. The first MANET node as set forth in claim 1 wherein said at least one RF link cost parameter is a zero value and said at least one node cost parameter is a zero value if said first MANET node receives said RREQ message directly from said source MANET node.

3. The first MANET node as set forth in claim 1 wherein said controller stores said initial route cost information retrieved from said RREQ message in a route table associated with said first MANET node.

4. The first MANET node as set forth in claim 1 wherein the first MANET node is a cell phone.

5. The first MANET node as set forth in claim 1 wherein said controller forwards said RREQ message containing said updated route cost information to a next MANET node between said first MANET node and said destination MANET node in said first route.

6. The first MANET node as set forth in claim 5 wherein said controller further receives a Route Reply (RREP) message generated by said destination MANET node and retrieves initial route cost information from said RREP message, said initial route cost information comprising at least one RF link cost parameter and at least one node cost parameter.

7. The first MANET node as set forth in claim 6 wherein said at least one RF link cost parameter in said RREP message is a zero value and said at least one node cost parameter in said RREP message is a zero value if said first MANET node receives said RREP message directly from said destination MANET node.

8. The first MANET node as set forth in claim 6 wherein said controller stores said initial route cost information retrieved from said RREP message in said route table.

9. The first MANET node as set forth in claim 6 wherein said controller updates said initial route cost information in said RREP message by adding to said initial route cost information (i) an RF link cost parameter associated with an RF link to an immediately preceding MANET node between said first MANET node and said destination MANET node in said first route and (ii) a first node cost parameter associated with said first MANET node.

10. The first MANET node as set forth in claim 9 wherein said controller forwards said RREP message containing said updated route cost information to a next MANET node between said first MANET node and said source MANET node in said first route.

11. For use in a mobile ad hoc network formed by a plurality of mobile ad hoc network (MANET) nodes, a method of aggregating in a first MANET node route cost information associated with a first route from a source MANET node to a destination MANET node, the method comprising the steps of:
wirelessly communicating with other ones of the plurality of MANET nodes;
receiving in the first MANET node a Route Request (RREQ) message generated by the source MANET node;
retrieving initial route cost information from the RREQ message, the initial route cost information comprising at least one radio frequency (RF) link cost parameter and at least one node cost parameter;
updating the initial route cost information in the RREQ message by adding to the initial route cost information (i) an RF link cost parameter associated with an RF link to an immediately preceding MANET node between the first MANET node and the source MANET node in the first route and (ii) a first node cost parameter associated with the first MANET node;
assigning a first node-specific weight to the at least one RF link cost parameter added to the initial route cost information; and
assigning a second node-specific weight to the at least one node cost parameter added to the initial route cost information.

12. The method as set forth in claim 11 wherein the at least one RF link cost parameter is a zero value and the at least one node cost parameter is a zero value if the first MANET node receives the RREQ message directly from the source MANET node.

13. The method as set forth in claim 11 further comprising the step of storing the initial route cost information retrieved from the RREQ message in a route table associated with the first MANET node.

14. The method as set forth in claim 11 where in the first MANET node is a cell phone.

15. The method as set forth in claim 11 further comprising the step of forwarding the RREQ message containing the updated route cost information to a next MANET node between the first MANET node and the destination MANET node in the first route.

16. The method as set forth in claim 15 further comprising the steps of:
receiving in the first MANET node a Route Reply (RREP) message generated by the destination MANET node; and
retrieving initial route cost information from the RREP message, the initial route cost information comprising at least one RF link cost parameter and at least one node cost parameter.

17. The method as set forth in claim 16 wherein the at least one RF link cost parameter in the RREP message is a zero value and the at least one node cost parameter in the RREP message is a zero value if the first MANET node receives the RREP message directly from the destination MANET node.

18. The method as set forth in claim 16 further comprising the step of storing the initial route cost information retrieved from the RREP message in the route table.

19. The method as set forth in claim 16 further comprising the step of updating the initial route cost information in the RREP message by adding to the initial route cost information (i) an RF link cost parameter associated with an RF link to an immediately preceding MANET node between the first MANET node and the destination MANET node in the first route and (ii) a first node cost parameter associated with the first MANET node.

20. The method as set forth in claim 19 further comprising the step of forwarding the RREP message containing the updated route cost information to a next MANET node between the first MANET node and the source MANET node in the first route.

* * * * *